E. ADLER.
EXPANSION BOLT.
APPLICATION FILED JAN. 9, 1914.
1,108,656.
Patented Aug. 25, 1914.
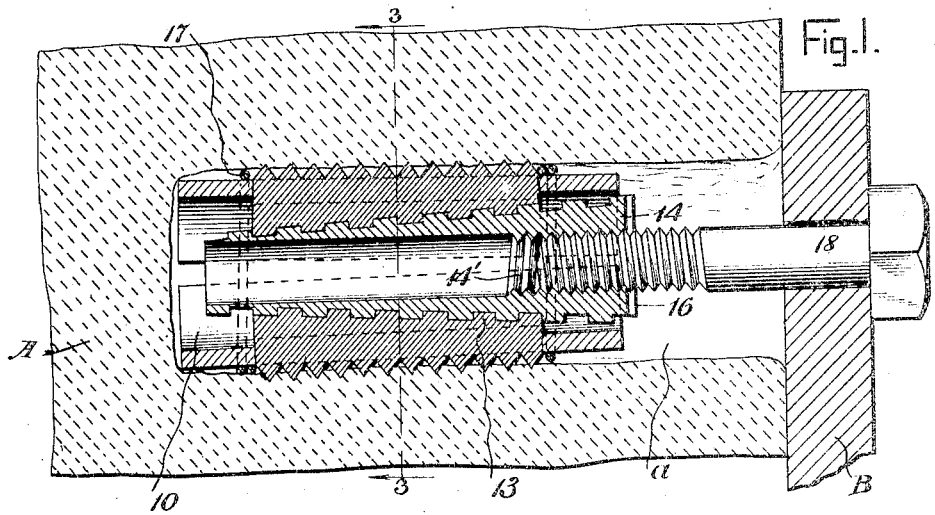
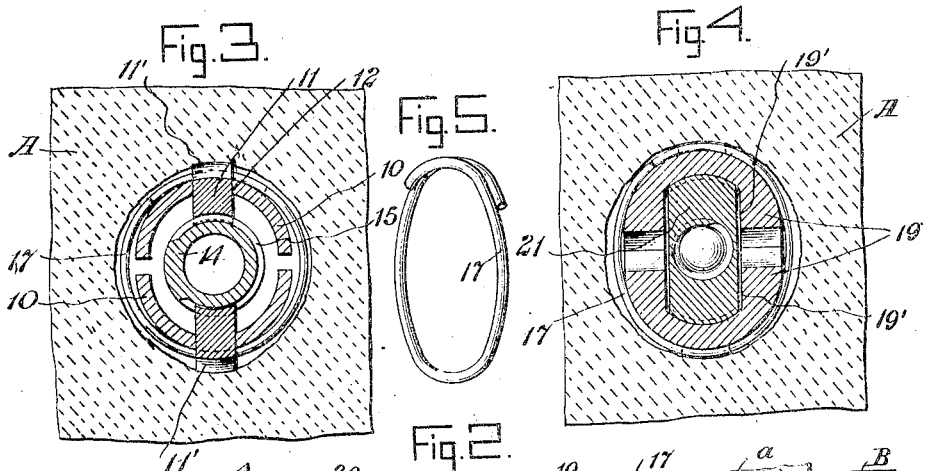
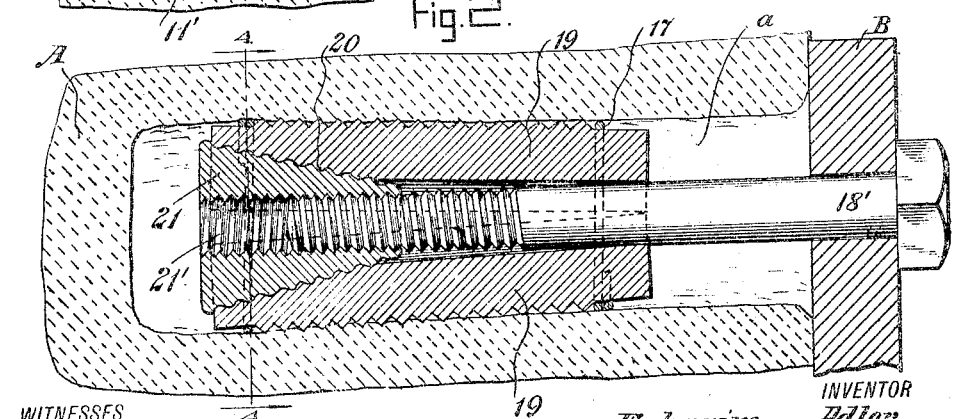
WITNESSES
INVENTOR
Ephraim Adler
BY
ATTORNEYS

UNITED STATES PATENT OFFICE.

EPHRAIM ADLER, OF NEW YORK, N. Y.

EXPANSION-BOLT.

1,108,656.   Specification of Letters Patent.   Patented Aug. 25, 1914.

Application filed January 9, 1914. Serial No. 811,175.

*To all whom it may concern:*

Be it known that I, EPHRAIM ADLER, a citizen of the United States, and a resident of the city of New York, borough of Manhattan, in the county and State of New York, have invented a new and Improved Expansion-Bolt, of which the following is a full, clear, and exact description.

This invention relates to builders' hardware and has particular reference to means for attaching plates, studding or other parts to masonry walls or other structures, such devices being commonly known as expansion bolts.

Among the objects of this invention is to simplify and improve this class of devices to render them more serviceable than similar devices commonly used.

The foregoing and other objects of the invention will hereinafter be more fully described and claimed and illustrated in the drawings forming a part of this specification in which like characters of reference indicate corresponding parts in all the views, and in which—

Figure 1 is a longitudinal section of one form of the invention; Fig. 2 is a similar view of a different form of the invention; Fig. 3 is a transverse section on the line 3—3 of Fig. 1; Fig. 4 is a transverse section on the line 4—4 of Fig. 2; and Fig. 5 is a perspective detail referred to below.

The several parts of the device may be made of any suitable materials and the relative sizes and proportions, as well as the general design of the mechanism, may be varied to a considerable extent without departing from the spirit of the invention hereinafter more fully set forth and specifically claimed.

In that form of the invention shown in Fig. 1 the device comprises a two-part sleeve 10, each part having an anchoring device 11 having serrations or corrugations 11' adapted to bite or embed themselves in the structure of the masonry A. In this form of the invention each of the anchor members projects through a slot 12 in one of the parts of the sleeve 10, and such anchor is therefore preferably shorter than the sleeve. The inner or adjacent edges of the anchor members 11 are provided with spiral threads 13, and said inner edges of the anchors are preferably divergent along general lines.

At 14 I show a tapering wedge having a thread 15 coöperating with the aforesaid spiral threads 13 of the anchors. The outer or larger end of the wedge is provided with a seat 16 for the application of a screw driver or a wrench whereby said wedge may be forced inwardly for the purpose of spreading the anchors for positive engagement with the walls of the socket $a$ of the wall or other structure. In this form of the invention the sleeve as a whole may be slipped freely into the socket, the parts thereof being adapted to be secured temporarily together, if desired, by means of spring rings 17, and then the wedge may be forced into the position indicated above, to secure the sleeve and anchoring devices in place. Said wedge is provided with an internal screw threaded socket 14' for coöperation with the binding screw 18 passing through the plate B which is being secured to the wall.

In Fig. 2 I show a slightly different form or one in which the sleeve and anchor members coincide, forming two parts 19, each having serrations of the character referred to above, for direct gripping coöperation of the socket wall, and at the inner or rear end of the sleeve are arranged toothed or serrated tapering walls 20 for coöperation with a wedge 21 having correspondingly formed edges for coöperation with said walls 20. In this form of the invention the wedge is put in place with the sleeve, the small end of the wedge being projected into the space between the tapered walls 20. Said wedge 21, like the one previously described, is of solid or one piece construction, and is provided with an interior socket having a screw thread 21 for coöperation with the binding bolt 18'. The wedge 21 is tapered in one direction but is flat in the other direction and operates in notches 19' of the sleeve members. When this sleeve with the wedge therein is inserted into the socket $a$, the wedge will be prevented from rotating by reason of its coöperation with the notches above described. When the binding bolt or screw 18' is inserted and connected to the wedge, the first effect of the draft upon the bolt will be to cause the wedge to be drawn bodily toward the outside of the socket, the corrugations of the wedge jumping or snapping over the corresponding corrugations of the walls 20, whereby the continued turning or binding action of the bolt will cause the members 19 of the sleeve to be forced apart and into biting engagement with the wall of the socket.

In both forms of the invention herein illustrated it will be noted that the wedge constitutes the nut for coöperation with the bolt, and hence the bolt is not caused to coöperate directly with the sleeve members or the parts connected directly to the concrete. It is furthermore to be noted that the wedge will always act to retain its position with relation to the sleeve members, holding them expanded even though the bolt should become loose due to shrinkage of the material or otherwise.

Having thus described my invention, I claim as new and desire to secure by Letters Patent:

1. The herein described expansion bolt comprising, in combination, a pair of independent sleeve members movable toward and from each other, said members having teeth or points for engagement with the wall of the socket and being provided on their inner or adjacent faces with divergent walls having transverse ribs, a wedge acting between said sleeve members and having movable engagement with said ribs and serving to force the sleeve members apart, said wedge having an internal socket with a screw thread, and a clamping bolt coöperating with said wedge thread.

2. The herein described expansion bolt comprising, in combination, a pair of sleeve members having along parts of their opposite walls a series of teeth, temporary connections surrounding said sleeve members and maintaining them together but permitting expansion of separation thereof, a wedge of solid construction acting between said sleeve members and serving to interlock therewith and hold the sleeve members in separated relation, and a threaded bolt coöperating with the interior of said wedge, substantially as and for the purposes set forth.

In testimony whereof I have signed my name to this specification in the presence of two subscribing witnesses.

EPHRAIM ADLER.

Witnesses:
GEO. L. BEELER,
PHILIP D. ROLLHAUS.